US012700778B2

(12) United States Patent

Ebsworth et al.

(10) Patent No.: US 12,700,778 B2

(45) Date of Patent: Aug. 4, 2026

(54) BRACKET FOR COUPLING A POWER ELECTRONIC DEVICE AND A COMPRESSOR ASSEMBLY

(71) Applicant: c/o Garrett Transportation I Inc., Torrance, CA (US)

(72) Inventors: Michael Ebsworth, Uxegney (FR); Chris Groves, Domèvre sur Durbion (FR); Tanguy Domange, Uxegney (FR); Arnaud Amet, Thaon-les-Vosges (FR); Romain Guillot, Thaon-les-Vosges (FR); Cedric Karwat, Nancy (FR); Benjamin Chaudy, Thaon-les-Vosges (FR); Anil Jaswal, Epinal (FR)

(73) Assignee: GARRETT TRANSPORTATION INC., Torrance, CA (US)

( * ) Notice: Subject to any disclaimer, the term of this patent is extended or adjusted under 35 U.S.C. 154(b) by 396 days.

(21) Appl. No.: 18/538,790

(22) Filed: Dec. 13, 2023

(65) Prior Publication Data

US 2025/0055355 A1     Feb. 13, 2025

(51) Int. Cl.
H02K 5/22 (2006.01)
H02K 11/33 (2016.01)
(52) U.S. Cl.
CPC ............. H02K 11/33 (2016.01); H02K 5/225 (2013.01); H02K 2211/00 (2013.01)
(58) Field of Classification Search
CPC .......... H02K 5/225; H02K 7/14; H02K 11/33; H02K 2211/00
See application file for complete search history.

(56) References Cited

U.S. PATENT DOCUMENTS

| | | | | |
|---|---|---|---|---|
| 2015/0333602 A1* | 11/2015 | Mohr | ..................... | H02K 5/203 310/68 B |
| 2025/0023435 A1* | 1/2025 | Drexler | ................ | H02K 21/227 |
| 2025/0192637 A1* | 6/2025 | Arnold | ..................... | H02K 9/12 |

FOREIGN PATENT DOCUMENTS

| | | | | |
|---|---|---|---|---|
| CN | 115911665 A | * | 4/2023 | |
| JP | 2857407 B2 | * | 2/1999 | |

(Continued)

OTHER PUBLICATIONS

Tsukamoto, Machine Translation of JP2857407, Feb. 1999 (Year: 1999).*

(Continued)

*Primary Examiner* — Eric Johnson

(74) *Attorney, Agent, or Firm* — BelayIP

(57) ABSTRACT

A bracket includes a bracket housing that has a bore extending through the bracket housing and that has a channel extending through the bracket housing between a first channel opening and a second channel opening. The bore provides fluid communication between the power electronic device and the compressor assembly. A terminal block subassembly is disposed in the channel. The terminal block subassembly includes a plurality of busbars spaced apart from each other and each extending between a first busbar end and a second busbar end. An overmold encasement is disposed over the busbars between the first and second busbar ends. The first busbar ends are disposed adjacent to the first channel opening and electrically couple to a compressor assembly and the second busbar ends are disposed adjacent to the second channel opening and electrically couple to a power electronic device.

20 Claims, 5 Drawing Sheets

(56) References Cited

FOREIGN PATENT DOCUMENTS

JP          4200654  B2  *  12/2008
WO      WO-2024195427  A1  *   9/2024   ............  H02M 7/003

OTHER PUBLICATIONS

Machine Translation of JP4200654, Dec. 2008 (Year: 2008).*
Obata, Machine Translation of WO2024195427, Sep. 2024 (Year: 2024).*
Li, Machine Translation of CN115911665, Apr. 2023 (Year: 2023).*

* cited by examiner

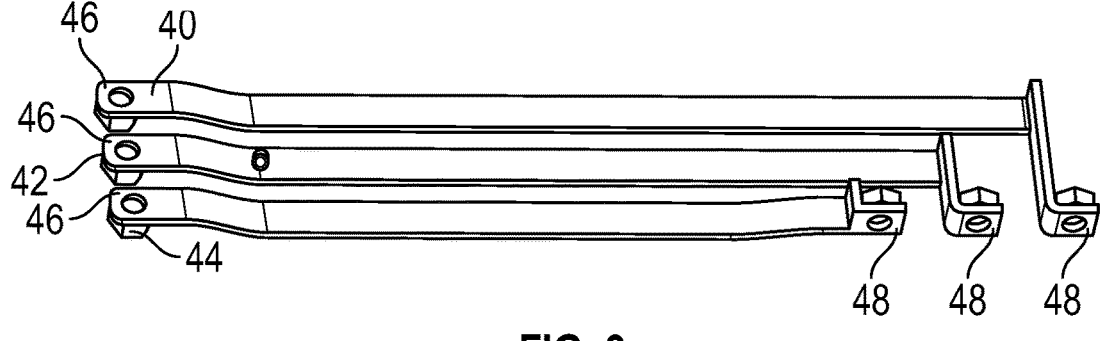
FIG. 3
FIG. 4
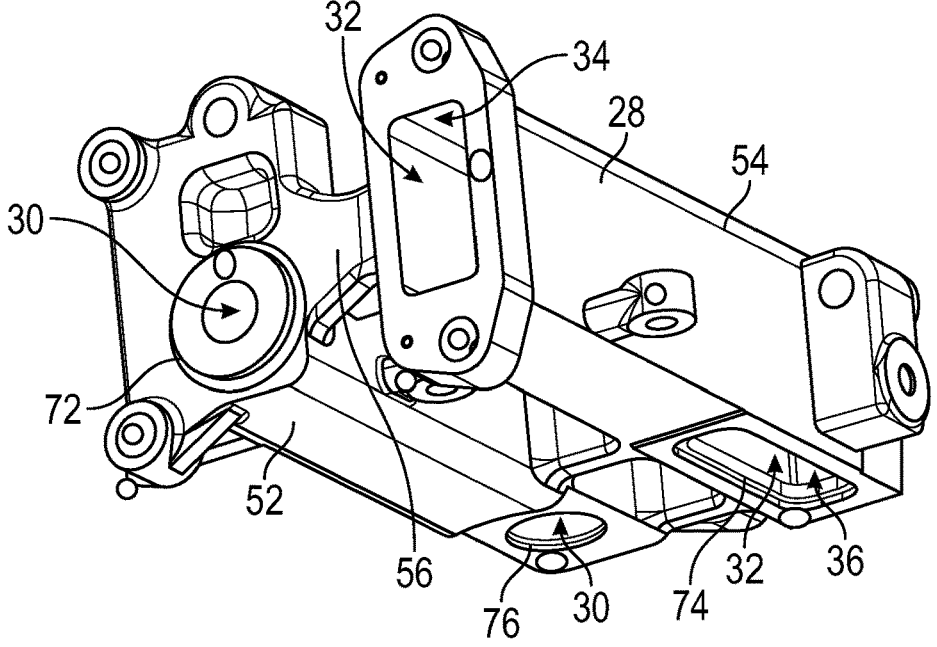
FIG. 5

BRACKET FOR COUPLING A POWER ELECTRONIC DEVICE AND A COMPRESSOR ASSEMBLY

CROSS-REFERENCE TO RELATED APPLICATIONS

This application is related to and claims all available benefit of French Provisional Patent Application 2308541 filed Aug. 7, 2023, the entire contents of which are herein incorporated by reference.

TECHNICAL FIELD

The present disclosure generally relates to brackets for compressor assemblies. More particularly, the present disclosure relates to a bracket that bridges or otherwise couples a power electronic device, for example an inverter, to a compressor assembly.

BACKGROUND

Electrifying auxiliaries with power supplies in commercial vehicle applications pose some challenges that include, among others, packaging considerations, such as for fuel cell compressors, E-compressors, E-turbocharges, and other types of compressor assemblies. For example, fuel cell technology is continuously gaining ground in E-mobility applications. Fuel cells require a constant supply of pressurized air, for which high-speed compressors are used. An inverter, which is often directly coupled to the turbo compressor as a power electronic device, drives the electric motor of the turbo compressor to provide the pressurized air to the fuel cell stack.

However, depending on the available space for packaging the fuel cell stack, the turbo compressor, and the inverter, it may be challenging to directly couple the inverter to the turbo compressor, e.g., the bottom of the turbo compressor. For instance, in some system designs, the height or vertical distance of available space for packaging the fuel cell stack, the turbo compressor and the inverter may be more limited. In such cases, it may be desirable to rearrange the inverter laterally adjacent to and spaced apart (e.g., laterally offset) from the turbo compressor to reduce the overall height of the compressor-inverter arrangement. Unfortunately, this may require external wiring, conduits, and the like, which are exposed, to couple the inverter to the turbo compressor for electrical, mechanical, and/or cooling functions. The exposed wiring, conduits, and/or the like may require additional considerations and/or testing to ensure proper sealing, mechanical load support, EMC/ESD shielding, and/or the like.

Accordingly, it is desirable to provide a structure or other means to couple a power electronic device to a compressor assembly that addresses one or more of the foregoing issues. Furthermore, other desirable features and characteristics of the subject matter disclosed herein will become apparent from the subsequent detailed description and the appended claims, taken in conjunction with the accompanying drawings and this background.

BRIEF SUMMARY

Brackets for coupling a power electronic device, for example an inverter, to a compressor assembly, and power electronic device and compressor assembly arrangements are provided.

In an embodiment, by way of example only, a bracket for coupling a power electronic device to a compressor assembly includes a bracket housing. The bracket housing has a bore extending through the bracket housing. The bracket housing further has a channel spaced apart from the bore and extends through the bracket housing between a first channel opening and a second channel opening. The bore is configured to provide fluid communication between the power electronic device and the compressor assembly. The bracket further includes a terminal block subassembly that is disposed in the channel extending between the first and second channel openings. The terminal block subassembly includes a plurality of busbars spaced apart from each other and each extending between a first busbar end and a second busbar end. An overmold encasement is disposed over the busbars between the first and second busbar ends. The first busbar ends are disposed adjacent to the first channel opening and are configured to electrically couple to the compressor assembly. The second busbar ends are disposed adjacent to the second channel opening and are configured to electrically couple to the power electronic device.

In another embodiment, by way of example only, a bracket for coupling a power electronic device to a compressor assembly includes a bracket housing. The bracket housing has a bore extending through the bracket housing. The bracket housing further has a channel spaced apart from the bore and extends through the bracket housing between a first channel opening and a second channel opening. The bore is configured to provide fluid communication between the power electronic device and the compressor assembly. The bracket housing is formed of metal and is configured to block an electromagnetic field(s) about the channel. The bracket further includes a terminal block subassembly that is disposed in the channel extending between the first and second channel openings. The terminal block subassembly includes a plurality of busbars spaced apart from each other and each extending between a first busbar end and a second busbar end. An overmold encasement is disposed over the busbars between the first and second busbar ends. The first busbar ends are disposed adjacent to the first channel opening and are configured to electrically couple to the compressor assembly. The second busbar ends are disposed adjacent to the second channel opening and are configured to electrically couple to the power electronic device.

In another embodiment, by way of example only, a power electronic device and compressor assembly arrangement includes a power electronic device, a compressor assembly, and a bracket that couples the power electronic device to the compressor assembly. The bracket includes a bracket housing that has a bore extending through the bracket housing and that has a channel spaced apart from the bore and extending through the bracket housing between a first channel opening and a second channel opening. The bore is configured to provide fluid communication between the power electronic device and the compressor assembly. The bracket further includes a terminal block subassembly that is disposed in the channel extending between the first and second channel openings. The terminal block subassembly includes a plurality of busbars that are spaced apart from each other and that each extends between a first busbar end and a second busbar end. An overmold encasement is disposed over the busbars between the first and second busbar ends. The first busbar ends are disposed adjacent to the first channel opening and are electrically coupled to the compressor assembly and the second busbar ends are disposed adjacent to the second channel opening and are electrically coupled to the power electronic device.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The accompanying drawings, which are incorporated into and constitute a part of this specification, illustrate implementations of the disclosure and together with the description, serve to explain the principles of the disclosure.

FIG. 3 is a perspective side view of busbars according to one or more embodiments of the present disclosure;

FIG. 4 is a perspective side view of a terminal block subassembly according to one or more embodiments of the present disclosure;

FIG. 5 is a perspective front view of a bracket housing according to one or more embodiments of the present disclosure;

DETAILED DESCRIPTION

Figure 1:
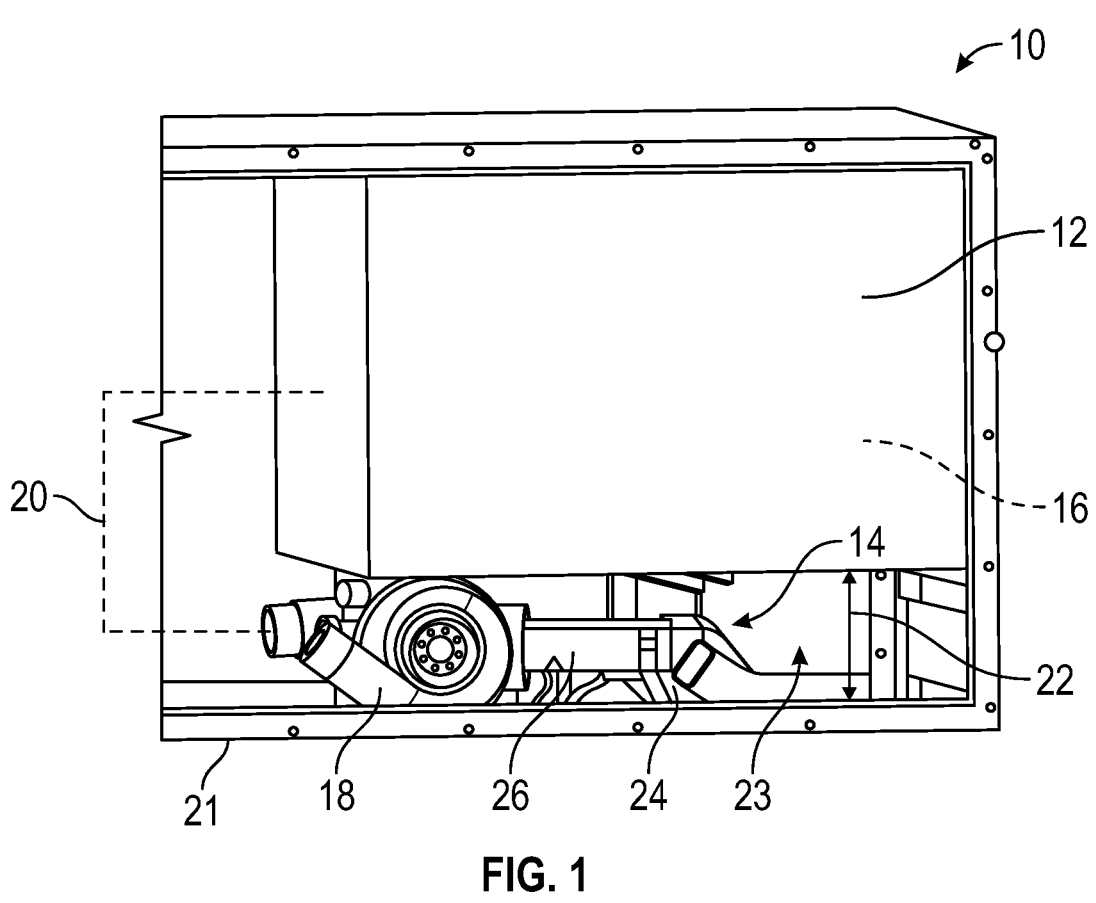
FIG. 1 is a perspective side view of fuel cell module unit including a power electronic device and compressor assembly arrangement that includes a bracket according to one or more embodiments of the present disclosure.
Figure 2:
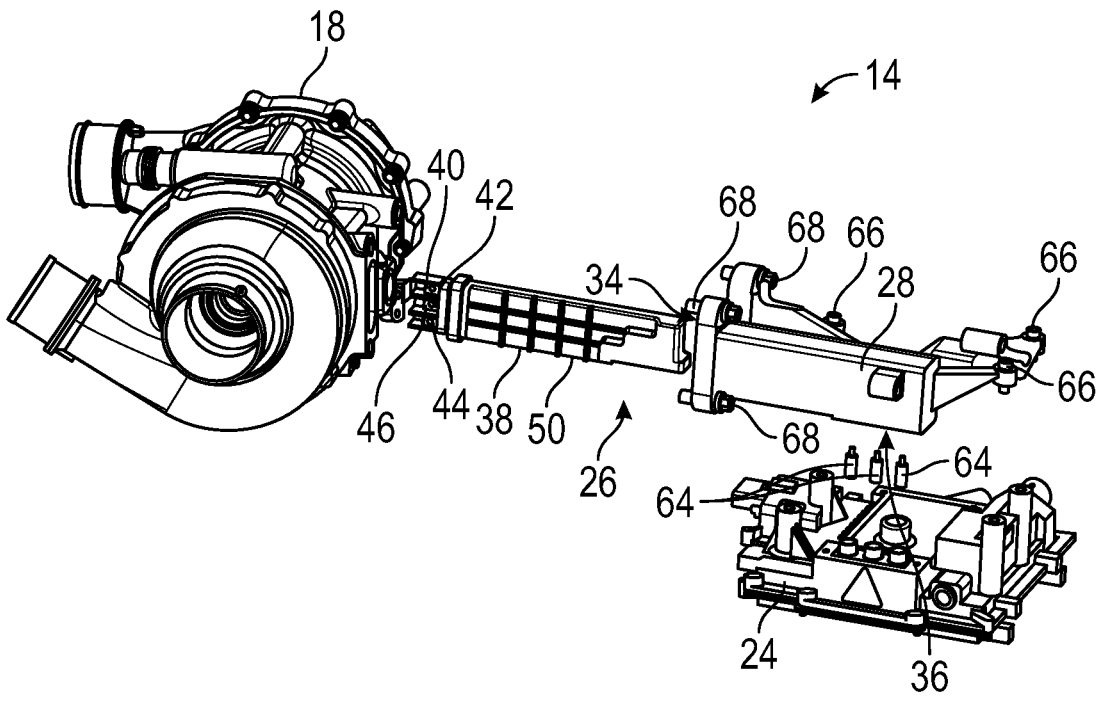
FIG. 2 is an exploded view of a power electronic device and compressor assembly arrangement that includes a bracket according to one or more embodiments of the present disclosure.
Figure 6:
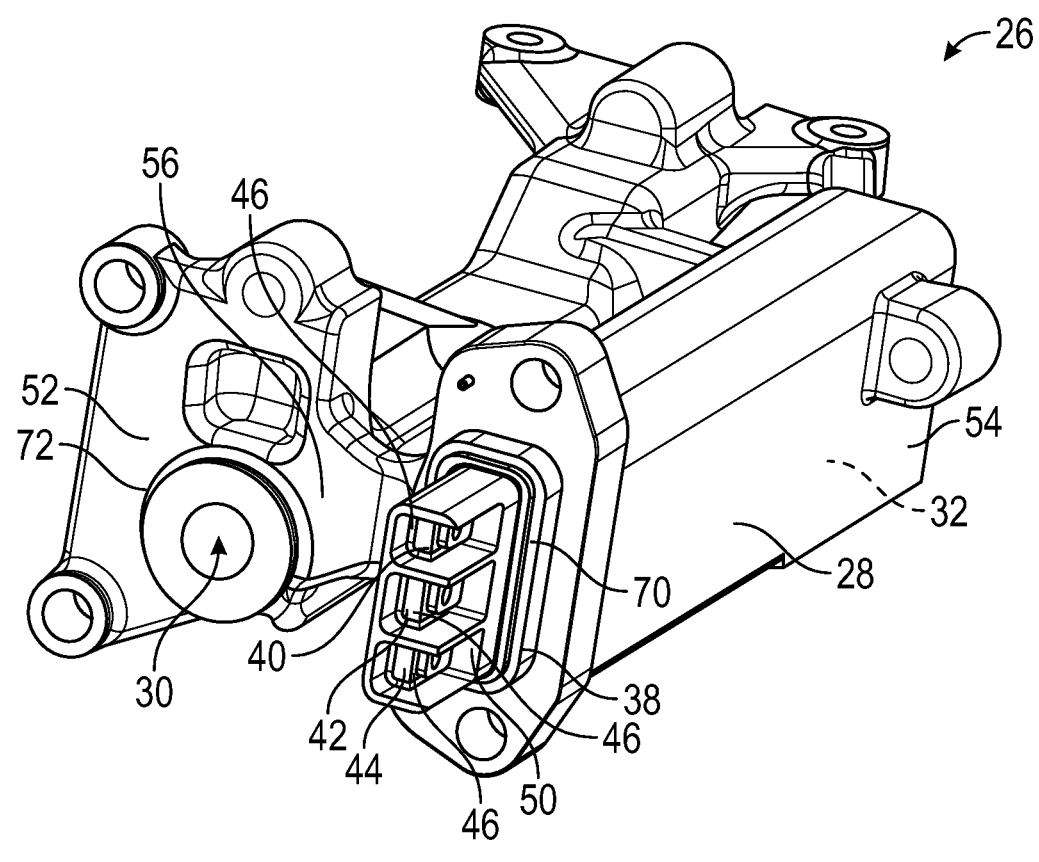
FIG. 6 is a perspective front view of a bracket including a terminal block subassembly that is disposed in a bracket housing according to one or more embodiments of the present disclosure.
Figure 7:
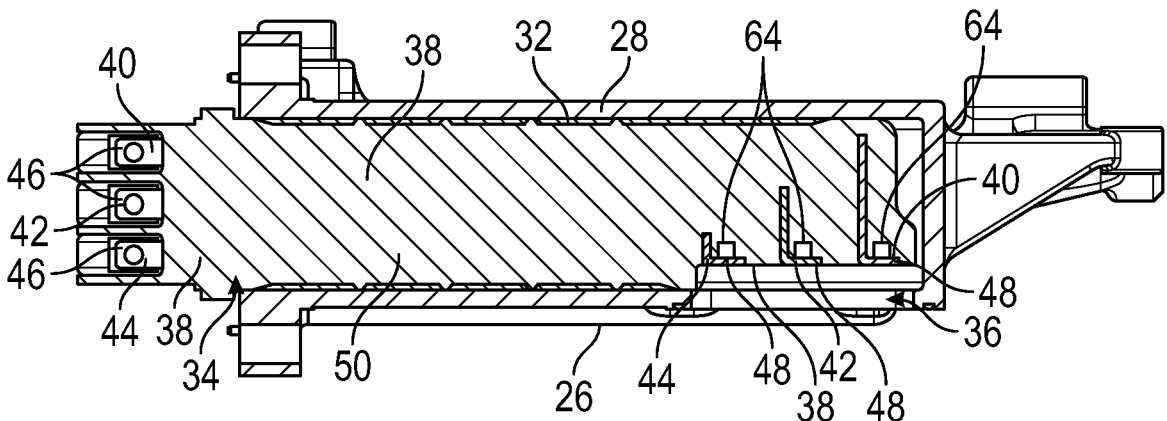
FIG. 7 is a cross-sectional view of a bracket including a terminal block subassembly that is disposed in a bracket housing according to one or more embodiments of the present disclosure.

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

The present disclosure generally relates to brackets that bridge or otherwise couple a power electronic device to a compressor assembly, and power electronic device and compressor assembly arrangements that include such brackets. In an exemplary embodiment, a bracket for coupling a power electronic device to a compressor assembly includes a bracket housing. The bracket housing has a bore that extends through the bracket housing. The bore is configured to provide fluid communication between the power electronic device and the compressor assembly. The bracket housing further has a channel that is spaced apart from the bore. The channel extends through the bracket housing between a first channel opening and a second channel opening.

A terminal block subassembly is disposed in the channel of the bracket housing extending between the first and second channel openings. The terminal block subassembly includes a plurality of busbars spaced apart from each other for carrying electrical current. Each of the busbars extends between a first busbar end and a second busbar end. The terminal block subassembly further includes an overmold encasement that is disposed over the busbars between the first and second busbar ends. The first busbar ends are disposed adjacent to the first channel opening and are configured to electrically couple to the compressor assembly. The second busbar ends are disposed adjacent to the second channel opening and are configured to electrically couple to the power electronic device.

In one or more embodiments of the present disclosure, the bracket housing is formed of metal and is fastened to the power electronic device and independently, is fastened to the compressor assembly. Advantageously, in an exemplary embodiment, the metal bracket housing of the bracket provides a fastened, mechanical load support/structure that bridges the power electronic device to the compressor assembly. Further, the bracket allows the power electronic device to be spaced apart and selectively positioned, for example laterally offset, from the compressor assembly to accommodate various packaging space requirements. Additionally, the metal bracket housing provides EMC/ESD shielding about the channel, which houses the busbars that provide electrical communication between the power electronic device and the compressor assembly. Moreover, the bore of the bracket housing allows fluid communication between the power electronic device and the compressor assembly to provide cooling function, for example, to allow a fluid to be advanced therethrough for cooling the power electronic device and the compressor assembly (e.g., motor of the compressor assembly, etc.). In one or more embodiments of the disclosure, the bracket further includes seals that interface with the power electronic device and the bracket housing and independently, with the compressor assembly and the bracket housing to ensure proper sealing along the interfaces.

Referring to FIG. 1, a fuel cell module unit 10 including a fuel cell 12 and a power electronic device and compressor assembly arrangement 14 in accordance with one or more embodiments of the present disclosure is provided. The fuel cell 12 includes a plurality of stacked fuel cells or a fuel cell stack 16 disposed therein. The power electronic device and compressor assembly arrangement 14 includes a compressor assembly 18 that is disposed underneath the fuel cell 12 and that supplies pressurized air to the fuel cell 12 along line 20 during operation of the fuel cell module unit 10. Although the module unit 10 and the compressor assembly 18 are illustrated as being configured as a fuel cell unit and a fuel cell compressor assembly, respectively, it is to be understood that the module unit 10 and the compressor assembly 18 may alternatively be configured, for example, as other electrifying auxiliaries for commercial vehicle applications in which the compressor assembly 18 is, for example, an E-compressor, an E-turbocharger, or other types of compressor assembly.

In an exemplary embodiment, the power electronic device and compressor assembly 14 includes the compressor assembly 18, a power electronic device 24, and a bracket 26 that couples the power electronic device 24 to the compressor assembly 18. As illustrated, the power electronic device and compressor assembly arrangement 14 is disposed under the fuel cell 12 in a package space 23 defined between a module base 21 and the fuel cell 12 of the fuel cell module unit 10. The package space 23 includes a vertical dimension or height (indicated by double-headed arrow 22) between the module base 21 and the fuel cell 12 that is relatively limited compared to the size or height of the compressor assembly 18. As such, coupling the power electronic device 24 directly to, for example, the bottom of the compressor assembly 18 would be challenging if not impractical due to the limited height 22 or vertical dimension(s) of the package space 23. In one or more embodiments of the disclosure, the power electronic device 24 is laterally offset from the compressor assembly 18 and the bracket 26 extends therebetween to couple the power electronic device 24 to the compressor assembly 18 so that the power electronic device and compressor assembly 14 can be accommodated within the package space 23 given its limited height 22.

Figure 8:
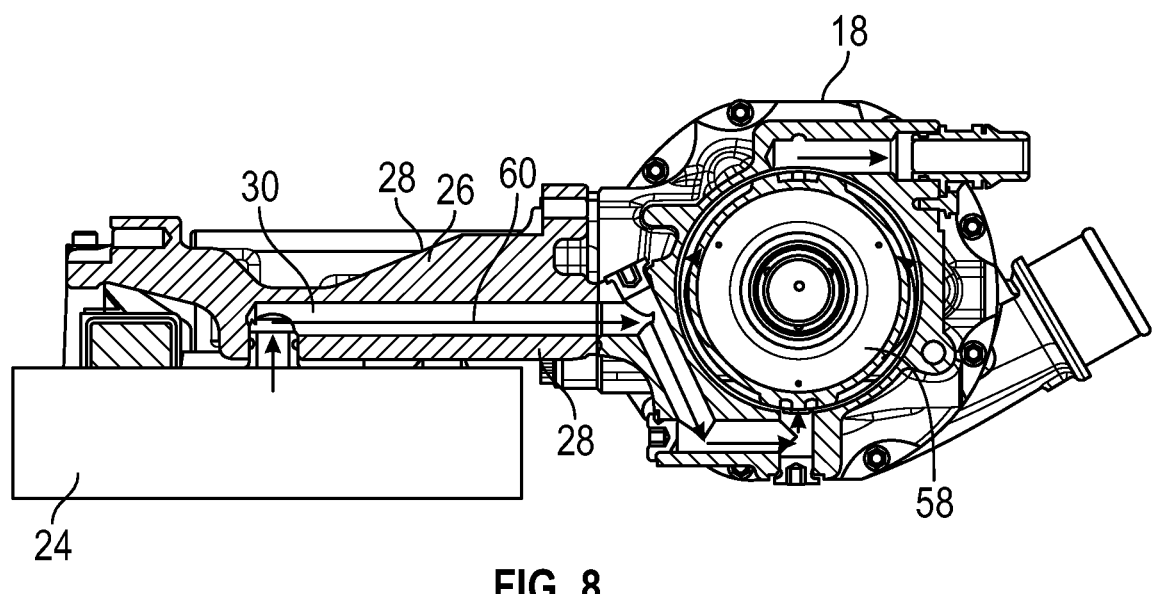
FIG. 8 is a cross-sectional view of a power electronic device and compressor assembly arrangement that includes a bracket with a terminal block subassembly that is disposed in a bracket housing according to one or more embodiments of the present disclosure.
Figure 9:
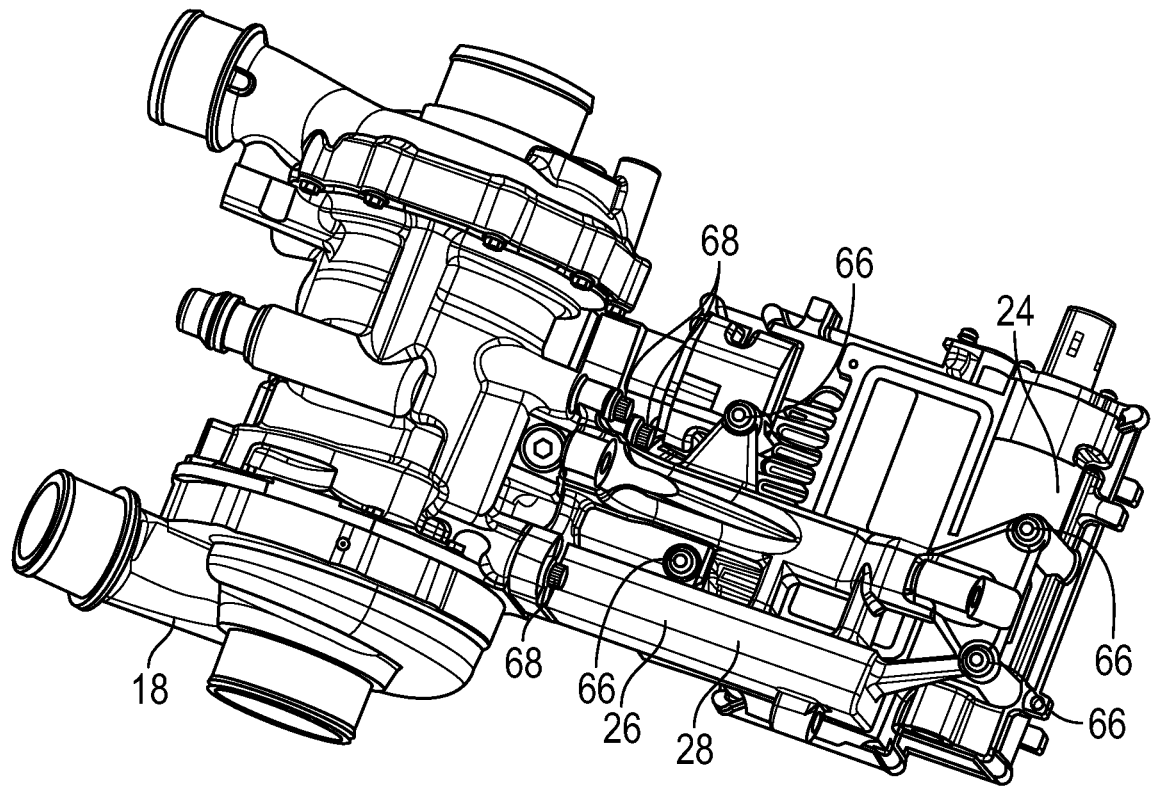
FIG. 9 is a perspective bottom view of a power electronic device and compressor assembly arrangement that includes a bracket according to one or more embodiments of the present disclosure.

Referring to FIGS. 2-9, the bracket 26 includes a bracket housing 28 that has a bore 30 that extends through the bracket housing 28. A channel 32 is spaced apart from the bore 30 and extends through the bracket housing 28 between channel openings 34 and 36. As illustrated in FIG. 8 and as will be discussed in further detail below, the bore 30 provides fluid communication between the power electronic device 24 and the compressor assembly 18.

A terminal block subassembly 38 is disposed in the channel 32 extending between the channel openings 34 and 36. The terminal block subassembly 38 includes a plurality of busbars 40, 42, and 44 that are spaced apart from each other. Each of the busbars 40, 42, and 44 extend between busbar end 46 and 48. In an exemplary embodiment, the busbars 40, 42, and 44 are formed of or include an electrically conductive material, such as, for example, copper, a copper alloy, or the like.

Figure 10:
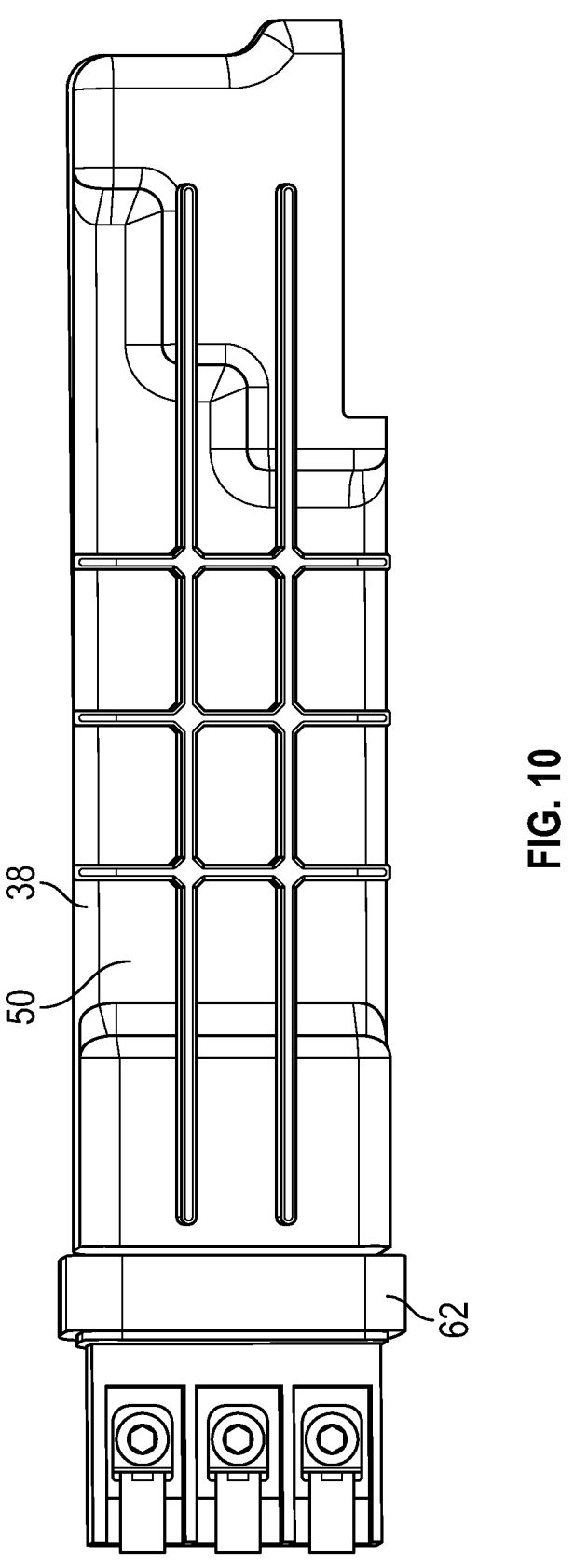
FIG. 10 is a perspective side view of a terminal block subassembly and an adapter according to one or more embodiments of the present disclosure.

The terminal block subassembly 38 further includes an overmold encasement 50 that is disposed over the busbars 40, 42, and 44 between the busbar ends 46 and 48. As illustrated, the busbar ends 46 are exposed (e.g., not encapsulated or fully covered by the overmold encasement 50) and disposed adjacent to the channel opening 34 and are electrically coupled to the compressor assembly 18. As illustrated, the terminal block subassembly 38 extends through the channel opening 34 with an end portion of the overmolding encasement 50 that carries the busbar ends 46 disposed outside of the bracket housing 28 adjacent to the channel opening 34. The busbar ends 46 may be directly coupled to the compressor assembly 18 or indirectly via an adapter 62 that is illustrated in FIG. 10.

With continuing reference to FIGS. 2-9, the opposite busbar ends 48 are also exposed (e.g., not encapsulated or fully covered by the overmold encasement 50) and disposed adjacent to the channel opening 36 and are electrically coupled to the power electronic device 24. As illustrated, the busbar ends 48 may be coupled to the power electronic device 24 via conductive pins 64. In an exemplary embodiment, the overmolding encasement 50 is formed of an electrically insulated material (e.g., low dielectric constant material), such as, for example, a plastic material that has been molded over the busbars 40, 42, and 44, e.g., via an injection overmolding process or the like. In an exemplary embodiment, the plastic material is chosen from a polyphenylene sulfide polymeric material, a polyester polymeric material, a polyamide polymeric material, or the like, and may further include glass fibers, fillers, or the like.

In an exemplary embodiment, the bracket housing 28 is configured having adjacent axial extending body portions 52 and 54 that are spaced apart from each other. One or more web portions 56 are disposed between and integrally connected with the axial extending body portions 52 and 54. The axial extending body portion 52 has the bore 30 extending therethrough and the axial extending body portion 54 has the channel 32 extending therethrough. In one or more embodiments of the disclosure, the terminal block subassembly 38 is configured as an elongated, axially extending block that is disposed in the channel 32 of the axial extending body portion 54. As illustrated in FIG. 5, in one or more embodiments of the disclosure, the bracket housing 28 has a substantially "H-shaped" cross-section.

In an exemplary embodiment, the bracket housing 28 is formed of metal and is configured to block an electromagnetic field(s) about the channel 32, thereby providing EMC/ESD shielding about the channel 32. In some embodiments, the bracket housing 28 is formed of aluminum or an aluminum alloy via a casting process to form an integral or monolithic structure. Post casting, the bracket housing 28 may optionally be further finished by a machining process.

In one or more embodiments of the disclosure, the power electronic device 24 is an inverter. In an exemplary embodiment, the inverter is configured to supply three-phase power via the three busbars 40, 42, and 44 to a motor 58 of the compressor assembly 18. During operation of the power electronic device and compressor assembly arrangement 14, the inverter supplies power to the electric motor that drives the compressor assembly to pressurize air that is fluidly communicated to the fuel cell 12 along line 20 (shown in FIG. 1). Further and as illustrated in FIG. 8, a heat transfer fluid 60 is fluidly communicated from the inverter/power electronic device 24 through the bore 30 to the compressor assembly 18 and is circulation about the motor 58 to provide cooling function to the compressor assembly 18.

In an exemplary embodiment, the bracket 26 is fastened to the power electronic device the fasteners 66. Likewise, the bracket 26 is fastened to the compressor assembly 18 via fasteners 68. Further, the bracket 26 further includes seals 74 and 76 that interface with the power electronic device 24 and the bracket housing 28 and independently, seals 70 and 72 that interface with the compressor assembly 18 and the bracket housing 28 to ensure proper sealing along the interfaces.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A bracket for coupling a power electronic device to a compressor assembly, the bracket comprising:

a bracket housing that has a bore extending through the bracket housing and that has a channel spaced apart from the bore and extending through the bracket housing between a first channel opening and a second channel opening, wherein the bore is configured to provide fluid communication between the power electronic device and the compressor assembly; and a terminal block subassembly disposed in the channel extending between the first and second channel openings and comprising:

a plurality of busbars spaced apart from each other and each extending between a first busbar end and a second busbar end; and an overmold encasement disposed over the busbars between the first and second busbar ends, wherein the first busbar ends are disposed adjacent to the first channel opening and are configured to electrically couple to the compressor assembly and the second busbar ends are disposed adjacent to the second channel opening and are configured to electrically couple to the power electronic device.

2. The bracket of claim 1, wherein the bracket housing comprises:

a first axial extending body portion having the bore extending therethrough;

a second axial extending body portion disposed adjacent to the first axial extending body portion and having the channel extending therethrough; and a web portion disposed between and coupling the first and second axial extending body portions.

3. The bracket of claim 2, wherein the terminal block subassembly is configured as an elongated, axially extending block that is disposed in the channel of the second axial extending body portion of the bracket housing.

4. The bracket of claim 2, wherein the bracket housing comprises a substantially "H-shaped" cross-section.

5. The bracket of claim 1, wherein the bracket housing is formed of metal.

6. The bracket of claim 5, wherein the metal comprises aluminum or an aluminum alloy.

7. The bracket of claim 1, wherein the overmold encasement is formed of a plastic material.

8. The bracket of claim 7, wherein the plastic material comprises a polyphenylene sulfide polymeric material, a polyester polymeric material, a polyamide polymeric material, glass fibers, fillers, or a combination thereof.

9. The bracket of claim 1, wherein the busbars comprise a first busbar, a second busbar, and a third busbar that are spaced apart from each other.

10. The bracket of claim 1, wherein the terminal block subassembly extends through the first channel opening and the first busbar ends of the busbars are disposed outside of the bracket housing adjacent to the first channel opening.

11. A bracket for coupling a power electronic device to a compressor assembly, the bracket comprising:

a bracket housing that has a bore extending through the bracket housing and that has a channel spaced apart from the bore and extending through the bracket housing between a first channel opening and a second channel opening, wherein the bore is configured to provide fluid communication between the power electronic device and the compressor assembly, and wherein the bracket housing is formed of metal and is configured to block an electromagnetic field(s) about the channel; and a terminal block subassembly disposed in the channel extending between the first and second channel openings and comprising:

a plurality of busbars spaced apart from each other and each extending between a first busbar end and a second busbar end; and an overmold encasement disposed over the busbars between the first and second busbar ends, wherein the first busbar ends are disposed adjacent to the first channel opening and are configured to electrically couple to the compressor assembly and the second busbar ends are disposed adjacent to the second channel opening and are configured to electrically couple to the power electronic device.

12. A power electronic device and compressor assembly arrangement comprising:

a power electronic device;

a compressor assembly; and a bracket that couples the power electronic device to the compressor assembly, wherein the bracket comprises:

a bracket housing that has a bore extending through the bracket housing and that has a channel spaced apart from the bore and extending through the bracket housing between a first channel opening and a second channel opening, wherein the bore is configured to provide fluid communication between the power electronic device and the compressor assembly; and a terminal block subassembly disposed in the channel extending between the first and second channel openings and comprising:

a plurality of busbars spaced apart from each other and each extending between a first busbar end and a second busbar end; and an overmold encasement disposed over the busbars between the first and second busbar ends, wherein the first busbar ends are disposed adjacent to the first channel opening and are electrically coupled to the compressor assembly and the second busbar ends are disposed adjacent to the second channel opening and are electrically coupled to the power electronic device.

13. The power electronic device and compressor assembly arrangement of claim 12, wherein the power electronic device is an inverter.

14. The power electronic device and compressor assembly arrangement of claim 13, wherein the busbars comprise a first busbar, a second busbar, and a third busbar, and wherein the inverter is configured as a three-phase power electronic device.

15. The power electronic device and compressor assembly arrangement of claim 12, wherein the bracket is fastened to the power electronic device and independently, is fastened to the compressor assembly.

16. The power electronic device and compressor assembly arrangement of claim 12, wherein the first busbar ends of the busbars are electrically coupled directly to the compressor assembly.

17. The power electronic device and compressor assembly arrangement of claim 12, wherein the first busbar ends of the busbars are electrically coupled indirectly to the compressor assembly via an adapter.

18. The power electronic device and compressor assembly arrangement of claim 12, further comprising a heat transfer fluid that is fluidly communicated through the bore of the bracket housing from the power electronic device to the compressor assembly.

19. The power electronic device and compressor assembly arrangement of claim 12, wherein the bracket housing is formed of metal and is configured to block an electromagnetic field(s) about the channel.

20. The power electronic device and compressor assembly arrangement of claim 12, wherein the bracket housing comprises:

a first axial extending body portion having the bore extending therethrough;

a second axial extending body portion disposed adjacent to the first axial extending body portion and having the channel extending therethrough; and a web portion disposed between and coupling the first and second axial extending body portions.

* * * * *